United States Patent [19]

Sepp

[11] 4,319,358

[45] Mar. 9, 1982

[54] INFORMATION TRANSMISSION

[75] Inventor: Hermann Sepp, Munich, Fed. Rep. of Germany

[73] Assignee: Siemens Aktiengesellschaft, Berlin & Munich, Fed. Rep. of Germany

[21] Appl. No.: 625,536

[22] Filed: Oct. 23, 1975

[30] Foreign Application Priority Data

Oct. 25, 1974 [DE] Fed. Rep. of Germany ....... 2450727

[51] Int. Cl.[3] .......................... H04K 1/00; H04B 1/10

[52] U.S. Cl. ........................................................ 375/1

[58] Field of Search ......................... 178/69.5 R, 69.1; 325/32, 42, 58, 65, 105; 331/107 G

[56] References Cited

U.S. PATENT DOCUMENTS

| | | | |
|---|---|---|---|
| 3,128,465 | 4/1964 | Brilliant | 178/69.5 R |
| 3,404,230 | 10/1968 | Hailey et al. | 178/69.5 R |
| 3,475,558 | 10/1969 | Cahn . | |
| 3,646,444 | 2/1972 | Bitzer | 325/58 |
| 3,706,933 | 12/1972 | Bidell et al. | 178/69.5 R |
| 3,713,041 | 1/1973 | Sakamoto et al. | 331/107 G |
| 3,714,573 | 1/1973 | Grossman | 325/65 |
| 3,796,969 | 3/1974 | Bosch et al. | 331/107 G |
| 3,851,271 | 11/1974 | Cooke et al. | 331/107 G |

OTHER PUBLICATIONS

"Modulation Techniques for Multiple Access . . . Satellite Repeater", Schwartz et al., *Proceedings of the IEEE,* vol. 54, No. 5, May 1966, pp. 763–777.

"A Comparison of Pseudo-Noise and Conventional Modulation . . . ", Blasbalg, *IBM Journal of R & D,* Jul. 1965, p. 241-255.

*Primary Examiner*—Howard A. Birmiel

*Attorney, Agent, or Firm*—Hill, Van Santen, Steadman, Chiara & Simpson

[57] ABSTRACT

The invention relates to information transmission systems in which the band is spread at the transmitting end by means of a pseudo-noise sequence and is returned to normal at the receiving end by a similar sequence. In such systems it is essential that the frequency of the various oscillators used for the frequency conversions should be kept constant, or alternatively that the oscillators at the receiving end should be synchronized with the oscillators at the transmitting end. In accordance with the present invention the oscillators at the transmitting end are synchronized by the clock frequency of the code generator and at the receiving end this clock frequency is extracted from the received signal and used to synchronize the oscillators in the various conversions. One of the oscillators at the receiving end may be a Gunn oscillator which is synchronized by applying the output of the pulse generator to its synchronizing input terminal through a frequency multiplier. In another arrangement the frequency of the Gunn oscillator is controlled by comparing the phase of the output with the phase of the output of a frequency multiplier supplied by the pulse generator. In yet another arrangement the outputs of the Gunn oscillator and the frequency multiplier are mixed to form a difference signal which is compared in phase with the outputs of a low frequency reference oscillator.

2 Claims, 8 Drawing Figures

INFORMATION TRANSMISSION

BACKGROUND OF THE INVENTION

1. Field of the Invention

The invention relates to an arrangement for information transmission in which at the transmitting end a band spread is effected by means of a pseudo-noise sequence, and at the receiving end this band spread is cancelled by means of an identical pseudo-noise sequence prior to the actual demodulation.

2. Description of the Prior Art

Information transmission systems of this type possess a transmission band width which is very much greater than the band width required for the transmission of the signal. In these systems the signal is transmitted as if it were "blurred" over a wide frequency spectrum. This band spread can be effected in different ways. The best known method consists in that the phase of the signal which has been modulated onto a carrier is switched over at the transmitting end with the aid of a high-bit-frequency pseudo-noise sequence produced by a code generator. Another possibility consists in using such a pseudo-noise sequence to switch over the frequency of the converter generator for the upwards mixer which converts the signal which is to be transmitted into the radio-frequency state.

The advantage of a band spread of this type can, on the one hand, consist in the fact that the same frequency band may be used simultaneously for a plurality of information connections in that the transmitter-receiver pairs employ different pseudo-noise sequences which exhibit good cross-correlation properties, i.e. that the maximum values of the cross-correlation functions are low in comparison to the maximum values of the auto-correlation functions of the individual pseudo-noise sequences. On the other hand, the band spread has the advantage that it is extremely insensitive to electromagnetic interference. This is due to the fact that an interference which may fall into the frequency band to be transmitted, and which can possess a large amplitude in comparison to the spectral amplitude of the signal, is itself spread in terms of energy over a wide frequency band during the cancellation of the band spread which must be effected at the receiving end, whereas the energy of the signal is drawn into a narrow frequency band. Thus, an information transmission system of this type is especially suitable for military uses in which the disadvantage of the high band width requirement cannot be accorded any significance in view of the advantage of a high resistance to interference.

In the design of an information transmission arrangement operating with a band spread, the long-term stability of the converter generators to be provided at the transmitting end and the receiving end is of particular importance. In the event of stringent demands on the resistance to interference, narrow band filters must be employed at the receiving end both in the correlation network which is required to cancel the band spread and also before the actual demodulator. These narrow band filters necessitate extreme stability of the converter oscillators, because the minimum band width of these band filters must be selected to be at least such that the signal can be received satisfactorily, taking into account the possible frequency drift of the converter oscillators.

As shown in practice, the long term stability of a thermally processed e.g. fifth harmonic quartz crystal exhibits a mean value of $7\times10^{-6}$ to $8\times10^{-6}$ within a period of five years. The likely frequency change in the temperature range from $-20°$ C. to $+70°$ C. amounts to approximately $+15\times10^{-6}$. If quartz oscillators of this type are used as a basis for multiplier chains, the maximum frequency deviation which may be expected at a nominal frequency, of e.g. 14 GHz, is in fact +322 KHz. Even when the quartz oscillators exhibit very good temperature stability during use, it is hardly possible to achieve a frequency fluctuation of less than approximately +110 KHz over a period of five years. On the other hand, if a high resistance to interference is to be achieved in such a system, the requisite long-term stability is in the order of +20 kHz. Thus it is not possible to employ a frequency multiplication of the desired type to construct a converter oscillator of this kind. Even when Gunn oscillators are used, long-term stabilities of the above-stated order can be achieved only with a very large outlay. The drift of approximately 20 kHz/°C. occurring in the case of a Gunn oscillator indicated the requisite outlay for temperature stabilization. In the event of long storage it would also be necessary to carry out a recalibration shortly before use.

SUMMARY OF THE INVENTION

The object of the invention is, for an information transmission arrangement of the type described in the introduction, to provide a realization in which, while ensuring the requisite low band width of the aforementioned receiving-end band filters, which is necessary in order to achieve the desired resistance to interference, it is possible to employ converter oscillators whose long-term stability is subject to considerably less stringent requirements than, as described in the introduction, would otherwise be necessary.

Commencing from an information transmission arrangement in which a band spread is effected at the transmitting end by means of a pseudo-noise sequence and in which at the receiving end this band spread is cancelled by means of an identical pseudo-noise sequence prior to the actual demodulator, the above object is realized in accordance with the invention in that at the transmitting end at least the converter generator for the upwards mixer is synchronized by the clock frequency of the code generator which produces the pseudo-noise sequence, and at the receiving end at least the converter generator for the downwards mixer is synchronized by the clock frequency of the code generator which produces the identical pseudo-noise sequence, and that at the receiving end this clock frequency is derived from the input signal by means of a synchronizing circuit.

The invention is based upon the essential recognition that the outlay, in itself very high, for the receiving-end synchronization of the pseudo-noise generator which is required to cancel the band spread and which is identical to that at the transmitting end, provides the possibility of achieving a synchronization, which satisfies the most stringent requirements, in respect of all the converter generators provided at the transmitting end and at the receiving end via the relevant clock generator, if the synchronization of the receiving-end clock generator is additionally derived from the signal incoming at the receiving end.

In a first preferred embodiment, at the transmitting end, and/or at the receiving end, the one converter generator is in the form of a frequency multiplier which is connected at its input to the clock generator which serves to produce the clock frequency.

In a second preferred embodiment, at the transmitting end, and/or at the receiving end, the one converter generator is in the form of an injection-synchronized Gunn oscillator whose synchronizing input is supplied with the output of the clock generator via a frequency multiplier.

In a third preferred embodiment, at the transmitting end, and/or at the receiving end, the one converter generator is a Gunn oscillator, which may be controlled in respect of its frequency, and whose control signal is obtained from the phase comparison of the Gunn oscillator output and the output of a frequency multiplier which is fed at its input by the clock generator.

In a fourth preferred embodiment, at the transmitting end, and/or at the receiving end, the one converter generator is likewise a Gunn oscillator which may be controlled in its frequency and in which, in a mixer, a difference signal is obtained from the Gunn oscillator output and the output of a frequency multiplier which is fed at its input by the clock generator. The difference signal is applied with the output of a low-frequency reference oscillator to the two inputs of a phase comparator, and the control signal for the Gunn oscillator is derived from this phase comparator.

The receiving-end synchronizing circuit is in known manner a delay locked loop, which synchronizes the clock generator in dependence upon the agreement between the pseudo-noise sequence contained in the input signal and the identical sequence produced by the receiving-end pseudo-noise generator.

In the arrangement in accordance with the invention, the fact that the fundamental pulse generator for the pseudo-noise generator is coupled to at least one converter generator at the receiving end, means that in the execution of a first synchronization or resynchronization following a loss of synchronization, it is not possible to achieve a high speed acquisition. In other words for an acquisition the clock generator can only be adjusted by a very small degree in comparison to its theoretical frequency. In practice this means that the execution of such a first synchronization or resynchronization occupies a period of time in the order of one second or several seconds, depending upon the period length of the pseudo-noise sequence being used. If this period of time is too long with regard to the special application of the subject of the invention, then it is necessary to provide special measures facilitating a high-seed acquisition of the clock generator. These measures can simply consist in providing that, at the receiving end, the one converter generator can be connected via a change-over switch selectively to the clock generator or to another auxiliary oscillator tuned to the theoretical frequency of the clock generator.

When the subject of the invention is used for the transmission of items of information from a mobile station, such as a flying object, to a receiving station, in particular another flying object, the relative movement between transmitting station and receiving station produces a so-called Doppler shift of the frequency of the received signal in relation to the frequency of the transmitter. This Doppler effect is practically compensated by the synchronization provided by the present invention.

BRIEF DESCRIPTION OF THE DRAWINGS

The invention is to be explained in further detail in the following making reference to exemplary embodiments represented in the drawings, on which.

DESCRIPTION OF THE PREFERRED EMBODIMENTS

Figure 1:
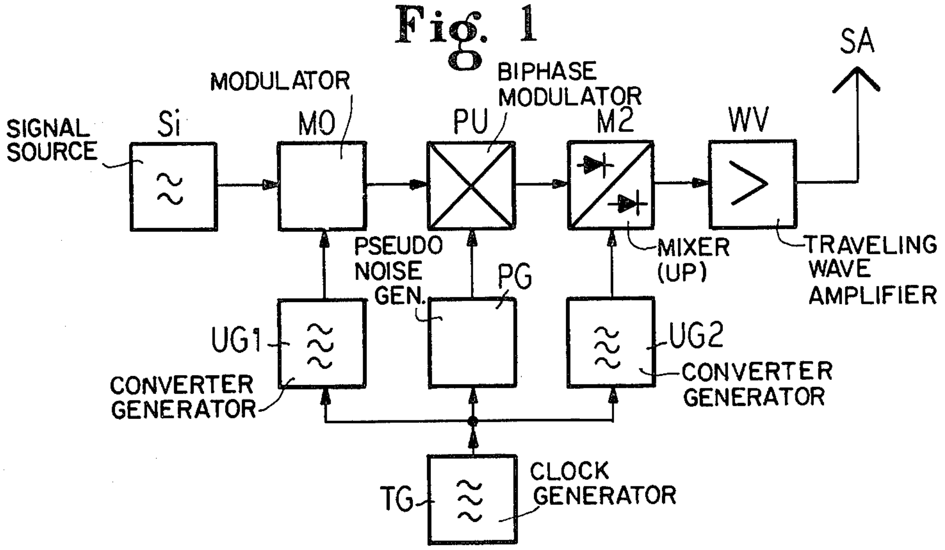
FIGS. 1 and 2 together illustate a first embodiment of a transmitter (FIG. 1) and of a receiver (FIG. 2) constructed in accordance with the invention.

In the block circuit diagram, represented in FIG. 1 of the transmitting end of an arrangement for information transmission in accordance with the invention, in the modulator MO the signal supplied by the signal source Si is modulated onto the carrier supplied by the converter generator UG1, and is then switched over in phase in the biphase modulator PU in dependence upon the pseudo-noise pulse sequence supplied by the pseudo-noise generator PG. The signal, whose band width has thus been spread out, is translated to the radio-frequency state in the upwards mixer M2, is amplified in the subsequently connected traveling wave amplifier WV, and is emitted via the transmitter antenna SA. The upwards mixer M2 obtains the carrier from the converter generator UG2. The pseudo-noise generator PG and the converter generators UG1 and UG2 are each connected by one input to the output of the clock generator TG which primarily supplies the clock frequency for the pseudo-noise generator PG but at the same time also synchronizes the converter generators UG1 and UG2 in accordance with the invention.

Figure 2:
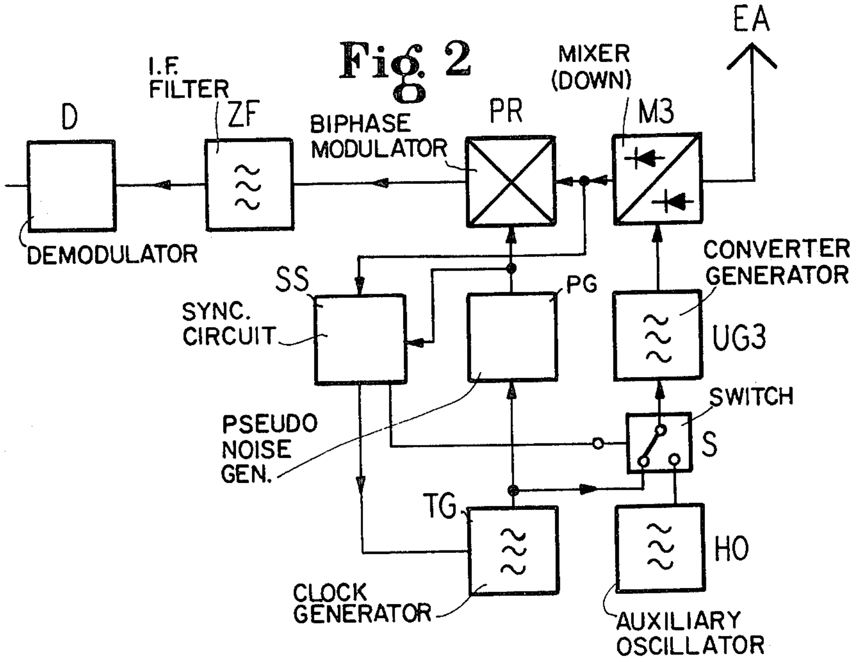

The signal received via the receiving antenna EA of the receiver illustrated in FIG. 2 is firstly transformed into an intermediate frequency level in the downwards mixer M3 which obtains the carrier from the converter generator UG3, and in this level is freed of the pseudo-noise pulse sequence superimposed at the transmitting end in a biphase moudlator PR. This is again effected with the aid of a pseudo-noise generator PG arranged at the receiving end which is identical to the pseudo-noise generator at the transmitting end, and which, as will be explained in detail in the following, is synchronized to the pseudo-noise sequence contained in the incoming signal. The signal, which in this way has been freed of the transmitting end band spread is then fed to an intermediate frequency filter ZF which is matched to the band width of said signal and which is in the form of a band-pass filter which is adjoined by the actual demodulator D.

As at the transmitting end, the receiving-end pseudo-noise generator PG is connected to the output of a fundamental pulse generator TG whose output signal simultaneously synchronizes the converter generator UG3 via the change-over switch S. The synchronization of the clock generator TG is effected via the synchronizing circuit SS which here consists of a delay locked loop, such as known, for example, through the publication "*IEEE Transactions on Communication Technology*" Vol. COM-15, No. 1, Feb. 1967, p. 69 to 78, in particular page 70, FIG. 1 and associated description (delay locked loop).

By way of comparison signal, the synchronizing circuit SS obtains the output signal of the pseudo-noise generator PG and the output signal of the downwards mixer M3. The change-over switch S indicates operation in the synchronous state in the switching position shown in the FIG. 2. On the execution of a first synchronization or a resynchronization, the change-over switch S is brought, via the synchronizing circuit SS into the second switching position in which the converter generator UG3 is connected to the auxiliary oscillator HO. The auxiliary oscillator HO is tuned to the theoretical frequency of the clock generator. This facilitates a high-speed acquisition in which the frequency of the clock generator TG is changed in a given direction via the synchronizing circuit SS, so that the two pseudo-noise pulse sequences which are to be compared with one another move past one another facilitating a rapid discovery of the synchronization point.

The clock generator TG at the transmitting end in FIG. 2, which possesses, for example, a clock frequency $f_t$ of 80 MHz can be designed for long-term frequency stability in the order of $15\times10^{-6}$ $f_t$. As the two converter generators UG1 and UG2 are dependent upon the clock frequency of the clock generator in terms of their synchronization, they exhibit a corresponding long-term frequency stability. The inconstancy of the clock generator TG is practically entirely compensated with the aid of the synchronization of the receiving-end clock generator TG by the synchronizing circuit SS. As the converter generator UG3 for the downwards mixer M3 is dependent upon the clock frequency of the clock generator, the signal at the output of the downwards mixer and the signal (whose band spread has been cancelled) present at the input of the intermediate frequency filter ZF possess a long-term constancy which meets even extreme demands. The accuracy is now merely governed by the degree of accuracy with which the synchronizing circuit SS synchronizes the receiving-end clock generator TG in dependence upon the incoming signal. With the type of synchronizing circuits employed, this means that only frequency changes occurring in periods of time which are shorter than the build-up time of the loop filter (loop band width approximately 50 Hz) of the delay locked loop are not compensated. However, possible short-term instability of this type will have virtually no influence on the information transmission, and furthermore when high quality Gunn oscillators are employed will be negligible. Thus with the aid of the present invention it is possible for example, in order to achieve the desired high resistance to interference, to select the band width of the intermediate frequency filter ZF to be practically equal to the band width of the wanted signal at the output of the biphase modulator PR.

Figure 3:
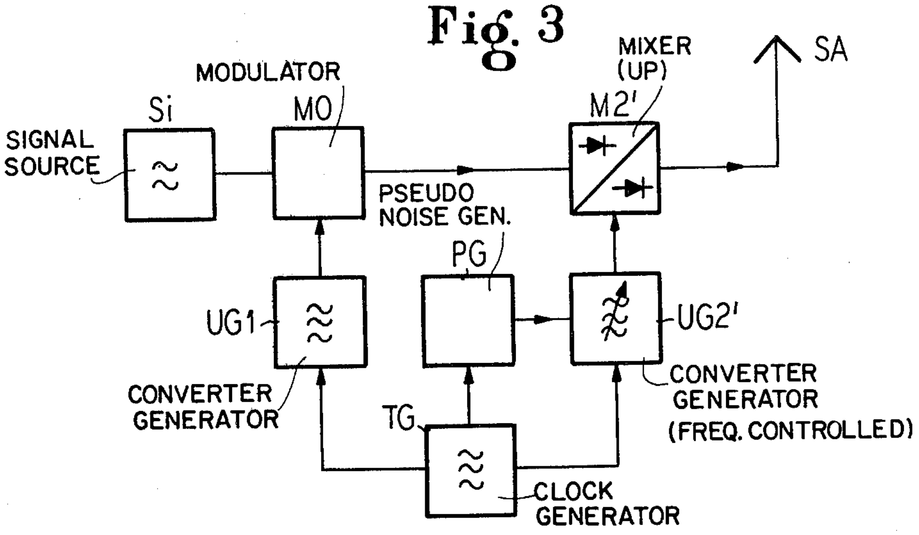
FIGS. 3 and 4 together illustrate a second embodiment of a transmitter (FIG. 3) and a receiver (FIG. 4) constructed in accordance with the invention.
Figure 4:
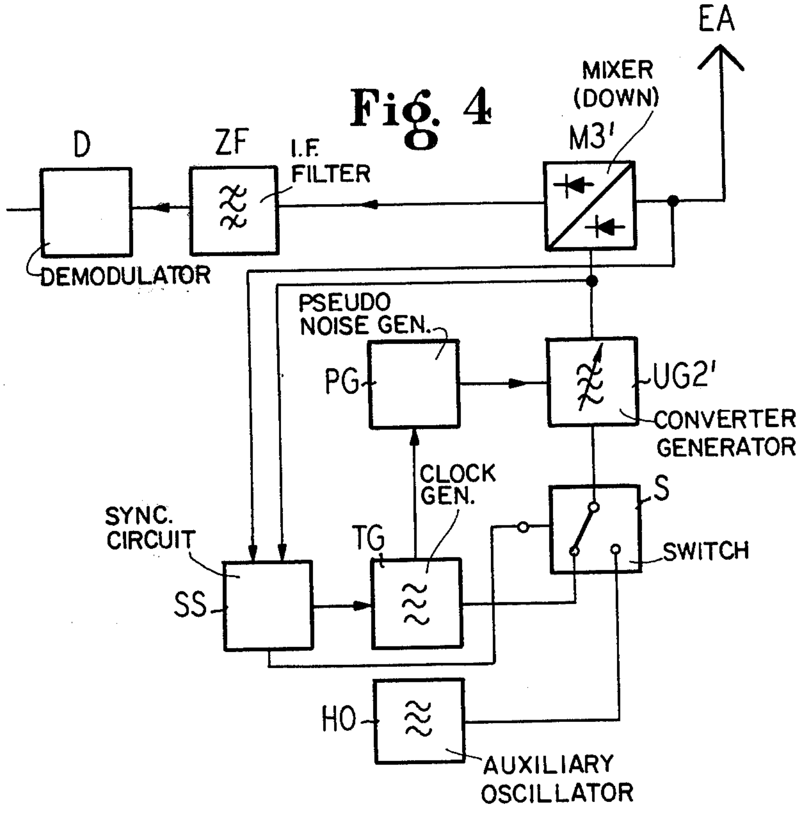

In the further exemplary embodiment, shown in FIGS. 3 and 4, of an arrangement for information transmission in accordance with the invention, in contrast to the exemplary embodiment in FIGS. 1 and 2, the spreading of the frequency band and the cancellation thereof at the receiving end is effected not by means of switching over the phase of the useful signal, but by switching over the frequency of the converter generator of the upwards mixer. At the transmitting end in the block circuit diagram shown in FIG. 3, the signal source Si again feeds the modulator MO in which the signal is translated into an intermediate frequency position with the aid of the carrier supplied by the converter generator UG1 and is then fed to the upwards mixer M2'. The converter generator UG2' is a generator which may be switched over in respect of its frequency and which is controlled via a control input (not marked) by the pseudo-noise pulse sequence of the pseudo-noise generator PG. The upwards mixer M2' is designed to possess a very wide band and at its output is connected to the transmitting antenna SA. The pseudo-noise generator PG is itself controlled by the clock frequency, of the clock generator TG. The converter generators UG1 and UG2' are also synchronized via the clock generator.

In accordance with FIG. 4, the transmitted signal which is incoming at the receiving antenna EA and which has been spread in respect of its band width is transformed in the downwards mixer M3' into the original band width in the intermediate frequency level by switching over the converter generator UG2' similarly as at the transmitting end, by the identical pseudo-noise sequence of the receiving-end pseudo-noise generator PG. The synchronizing circuit SS is connected via its two inputs, on the one hand to the input end of the downwards mixer M3' and, on the other hand, to the output of the converter generator UG2' whose frequency has been switched over. The other assemblies shown in FIG. 4 are identical to the assemblies shown in FIG. 2 which bear the same references, including functional symbols. Therefore, these do not require a further detailed explanation.

The converter generators UG1 and UG2 which are synchronized by the clock frequency of the clock generator TG can be embodied in different ways, as shown in FIGS. 5 to 8. For improved understanding, the fundamental pulse generator TG and the mixer M have been additionally entered in FIGS. 5 to 8.

Figure 5:
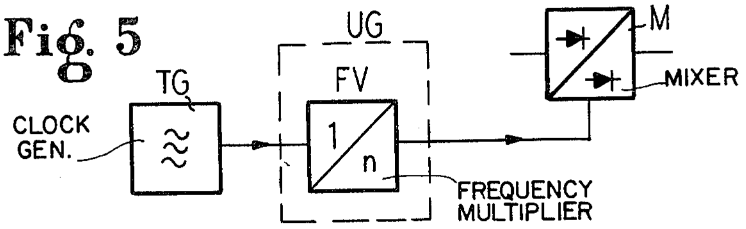
FIG. 5 is a first embodiment of a converter generator corresponding to the arrangements shown in FIGS. 1 to 4.

In the first preferred embodiment shown in FIG. 5, the converter generator consists of a frequency multiplier FV which multiplies the clock frequency by the factor n. This embodiment is particularly suitable for the construction of the converter generator UG1 shown in FIGS. 1 and 3, as generally the carrier power for these input end modulators can be kept low.

Figure 6:
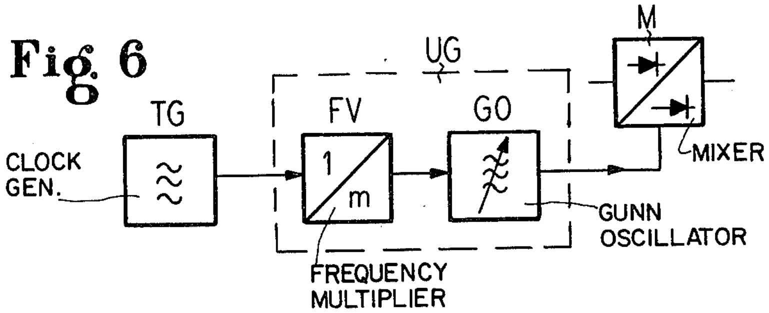
FIG. 6 is a second embodiment of a converter generator corresponding to the arrangements shown in FIGS. 1 to 4.
Figure 7:
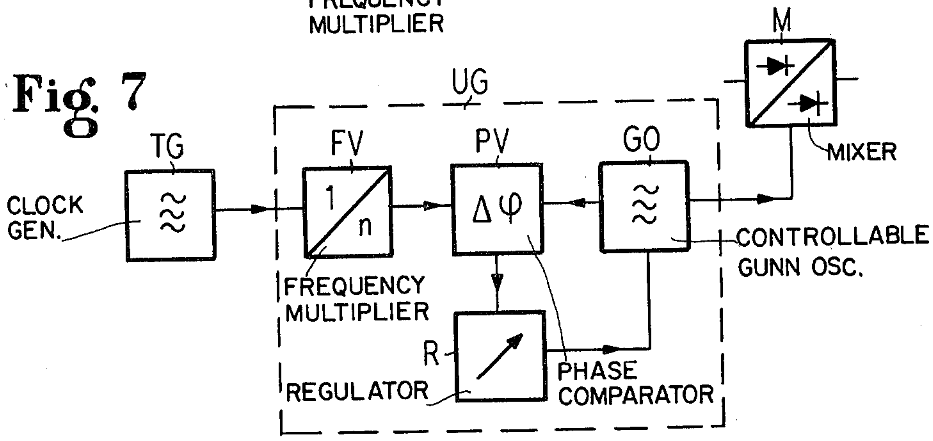
FIG. 7 illustrates a third embodiment of a converter generator corresponding to the arrangements shown in FIGS. 1 to 4.
Figure 8:
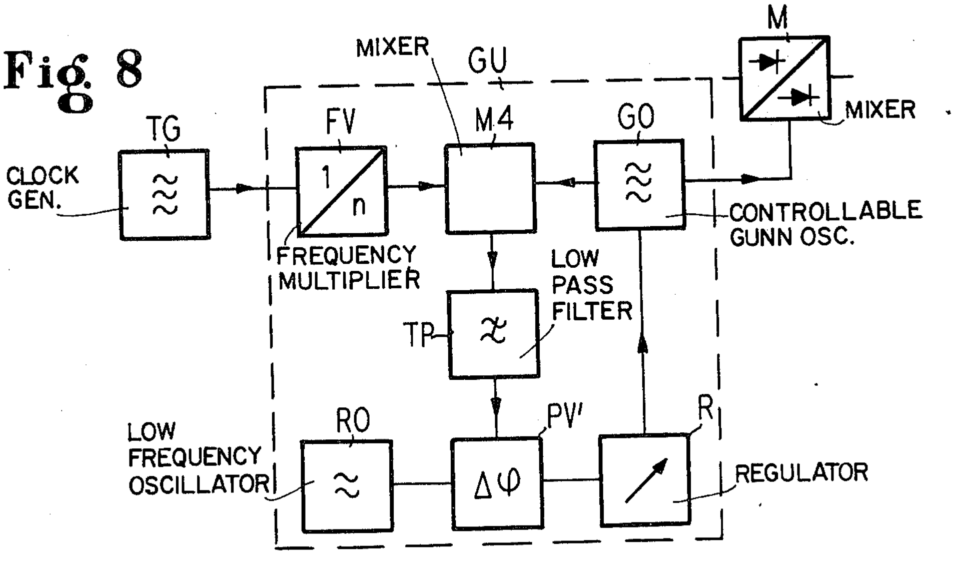
FIG. 8 is a fourth embodiment of a converter generator corresponding to the arrangements shown in FIGS. 1 to 4.

The embodiments shown in FIGS. 6 to 8, which employ a Gunn oscillator GO are particularly suitable for the construction of the converter generator UG2 for the upwards mixer. In the realization shown in FIG. 6, the converter generator consists of an injection-synchronized Gunn oscillator GO. The synchronizing input of the Gunn oscillator is supplied with a signal which is obtained from the clock frequency by means of the frequency multiplier FV and which oscillates at the fundamental frequency of the Gunn oscillator or a subharmonic thereof.

In the embodiment of FIG. 7, the converter generator consists of a controllable Gunn oscillator GO whose output together with the output of the clock generator TG which is supplied via a frequency multiplier FV is fed to a phase comparator PV which, in dependence upon a phase deviation, produces a control signal for the Gunn oscillator, which here is obtained via a regulating device R.

In the embodiment of FIG. 8, the converter generator is again constructed with a controllable Gunn oscillator GO whose output, together with the output of the clock generator TG supplied via the frequency multiplier FV, feeds the mixer M4. The output of the mixer is connected to a low-pass filter TP by way of which the difference frequency is fed to the one input of the phase comparator PV'. The other input of the phase comparator is connected to the output of a low frequency reference oscillator RO. The output voltage of the phase comparator acts upon the control input of the Gunn oscillator via the regulating device R. This embodiment has the advantage that it is not required that the frequency of the Gunn oscillator be a whole-numbered multiple of the clock frequency. Furthermore, in this case any phase jitter in the clock generator TG cannot spread to the Gunn Oscillator.

The arrangements, in particular of FIGS. 6 to 8 are also basically suitable for the construction of a converter generator UG2' as shown in FIGS. 3 and 4. For example, a converter generator of this type could in each case consist of two identical converter generators as shown in FIGS. 6 to 8, possessing different frequencies and being connected to the input of the mixer for the carrier oscillation via a change-over switch which is controlled by the pseudo-noise generator.

What I claim as my invention and desire to secure by Letters Patent of the United States is:

1. An arrangement for information transmission in which at the transmitting end a band spread is effected with a pseudo-noise sequence and at the receiving end the band spread is cancelled by an identical pseudo-noise sequence prior to actual demodulation, said arrangement comprising:

transmitting means including
- an input signal source,
- first modulator means connected to said source to modulate input signals,
- band spread means connected to said first modulator means, including a first pseudo-noise generator for causing a band spread of the modulated input signal,
- an upwards mixer connected to said band spread means,
- a first converter generator connected to said upwards mixer to provide carrier thereto, and
- a first clock generator connected to and controlling said pseudo-noise generator and said first converter generator,
- said first converter generator comprising a low frequency oscillator, a further mixer, a frequency multiplier connected to said first clock generator and to said further mixer, a Gunn oscillator connected to said further mixer, the outputs of said Gunn oscillator and said frequency multiplier mixed in said further mixer to form a difference signal, a phase comparator connected to said low frequency oscillator and to said mixer to compare the low frequency oscillations and the difference signal to produce a control signal, said Gunn oscillator including a frequency control input connected to said phase comparator to receive said control signal; and receiving means including
- a downwards mixer for receiving the band spread transmitted signals and transforming received signals to an intermediate frequency level,
- a second converter generator connected to said downwards mixer for providing carrier thereto,
- band spread cancellation means connected to said downwards mixer including a second pseudo-noise generator, for causing cancellation of the band spread,
- synchronizing means including a second clock generator connected to and controlling said second pseudo-noise generator and said second converter generator, and the synchronizing circuit connected between said downwards mixer and said second clock generator to control said second clock generator in accordance with the received signals, and
- demodulation means connected to said third modulator means to recover the input signals.

2. An arrangement for information transmission in which at the transmitting end a band spread is effected with a pseudo-noise sequence and at the receiving end the band spread is cancelled by an identical pseudo-noise sequence prior to actual demodulation, said arrangement comprising:

transmitting means including
- an input signal source;
- first modulator means connected to said source to modulate input signals,
- band spread means connected to said first modulator means, including a first pseudo-noise generator for causing a band spread of the modulated input signal,
- an upwards mixer connected to said band spread means,
- a first converter generator connected to said upwards mixer to provide carrier thereto, and
- a first clock generator connected to and controlling said pseudo-noise generator and said first converter generator, and receiving means including
- a downwards mixer for receiving the band spread transmitted signals and transforming received signals to an intermediate frequency level,
- a second converter generator connected to said downwards mixer for providing carrier thereto,
- band spread cancellation means connected to said downwards mixer including a second pseudo-noise generator, for causing cancellation of the band spread,
- synchronizing means including a second clock generator connected to and controlling said second pseudo-noise generator and said second converter generator, and a synchronizing circuit connected between said downwards mixer and said second clock generator to control said second clock generator in accordance with the received signals,
- said second converter generator comprising a low frequency oscillator, a further mixer, a frequency multiplier connected to said second clock generator and to said further mixer, a Gunn oscillator connected to said further mixer, the outputs of said Gunn oscillator and said frequency multiplier mixed in said further mixer to form a difference signal, a phase comparator connected to said low frequency oscillator and to said mixer to compare the low frequency oscillations and the difference signal to produce a control signal, said Gunn oscillator including a frequency control input connected to said phase comparator to receive said control signal, and demodulation means connected to said third modulator means to recover the input signals.

* * * * *